US012223902B2

(12) United States Patent
Jeong

(10) Patent No.: US 12,223,902 B2
(45) **Date of Patent: *Feb. 11, 2025**

(54) PIXELS, DISPLAY DEVICE COMPRISING PIXELS, AND DRIVING METHOD THEREFOR

(71) Applicant: Samsung Display Co., Ltd., Yongin-Si (KR)

(72) Inventor: Il Hun Jeong, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/518,607

(22) Filed: Nov. 24, 2023

(65) Prior Publication Data

US 2024/0087531 A1 Mar. 14, 2024

Related U.S. Application Data

(63) Continuation of application No. 17/609,122, filed as application No. PCT/KR2019/015203 on Nov. 8, 2019, now Pat. No. 11,922,872.

(30) Foreign Application Priority Data

May 8, 2019 (KR) ........................ 10-2019-0053918

(51) Int. Cl.
*G09G 3/3233* (2016.01)

(52) U.S. Cl.
CPC ... *G09G 3/3233* (2013.01); *G09G 2300/0842* (2013.01); *G09G 2310/0254* (2013.01); *G09G 2310/08* (2013.01); *G09G 2320/0214* (2013.01)

(58) Field of Classification Search
CPC .. G09G 3/3233; G09G 3/3266; G09G 3/3208; G09G 2300/0842;
(Continued)

(56) References Cited

U.S. PATENT DOCUMENTS 7,173,590 B2 2/2007 Uchino et al.
7,893,895 B2 2/2011 Uchino et al.
(Continued)

FOREIGN PATENT DOCUMENTS

CN 101409041 A 4/2009
CN 106023889 A 10/2016
(Continued)

OTHER PUBLICATIONS

International Search Report for International Application No. PCT/KR2019/015203 dated Feb. 20, 2020, 11 pages with Written Opinion and English Translation thereof.
(Continued)

*Primary Examiner* — Prabodh M Dharia
(74) *Attorney, Agent, or Firm* — Innovation Counsel LLP

(57) ABSTRACT

In a pixel, a display device including a pixel, and a method of driving the display device, the pixel includes a first transistor connected to a first power source, a fourth node and a first node, a second transistor connected to a third node, a data line and an i-th first scan line, a third transistor connected to the first node, the fourth node, and an i-th third scan line, a fourth transistor connected to the second node, an initialization voltage, and an i-th second scan line, a first capacitor connected between the third node and the first node, a second capacitor connected between the first node and the second node, and an organic light emitting diode connected between the second node and a second power source, wherein I is a natural number and the third transistor is an N-type transistor.

20 Claims, 16 Drawing Sheets

(58) Field of Classification Search

CPC ... G09G 2300/0861; G09G 2300/0852; G09G 2300/819; G09G 2310/0254; G09G 2310/08; G09G 2310/0286; G09G 2310/0245; G09G 2320/043; G09G 2320/0693; G09G 2320/0214; G09G 2330/021; G09G 2340/0435

USPC ........................................ 345/214, 76–77, 82

See application file for complete search history.

(56) References Cited

U.S. PATENT DOCUMENTS

| | | | | |
|---|---|---|---|---|
| 8,823,610 | B2 | 9/2014 | Miyazawa | |
| 8,866,705 | B2 * | 10/2014 | Takasugi | G09G 3/3233 345/82 |
| 8,982,017 | B2 | 3/2015 | Lee et al. | |
| 9,570,009 | B2 | 2/2017 | Woo et al. | |
| 10,062,321 | B2 | 8/2018 | Na et al. | |
| 10,297,656 | B2 | 5/2019 | Cho et al. | |
| 10,381,426 | B2 | 8/2019 | Ka et al. | |
| 10,614,758 | B2 | 4/2020 | Kim et al. | |
| 2009/0027310 | A1 | 1/2009 | Kim | |
| 2009/0140957 | A1 * | 6/2009 | Park | G09G 3/3233 345/76 |
| 2011/0018855 | A1 | 1/2011 | Miyazawa | |
| 2011/0115764 | A1 | 5/2011 | Chung | |
| 2012/0038683 | A1 * | 2/2012 | Park | G09G 3/3233 345/77 |
| 2014/0111490 | A1 | 4/2014 | Lee et al. | |
| 2014/0168180 | A1 | 6/2014 | Kim | |
| 2015/0109278 | A1 * | 4/2015 | Kim | G09G 3/3233 345/82 |
| 2016/0372037 | A1 | 12/2016 | Lim et al. | |
| 2017/0061880 | A1 * | 3/2017 | Choi | G09G 3/3233 |
| 2018/0006099 | A1 | 1/2018 | Ka et al. | |
| 2018/0130411 | A1 | 5/2018 | Zhou et al. | |
| 2018/0144684 | A1 | 5/2018 | Jeon et al. | |

FOREIGN PATENT DOCUMENTS

| | | | |
|---|---|---|---|
| JP | 2005-099715 | A | 4/2005 |
| JP | 2006-038963 | A | 2/2006 |
| JP | 4103851 | B2 | 6/2008 |
| JP | 2008-191450 | A | 8/2008 |
| KR | 10-2015-0068154 | A | 6/2015 |
| KR | 10-20170005945 | A | 1/2017 |
| KR | 10-2018-0004369 | A | 1/2018 |
| KR | 10-1859474 | B1 | 5/2018 |
| KR | 10-2018-0098442 | A | 9/2018 |
| KR | 10-2018-0115205 | A | 10/2018 |

OTHER PUBLICATIONS

Kim Hyun et al. Pixel and Organic Light Emittng Display Device Including the Same Jan. 17, 2017 Samsung Display Co L Td KR20170005945 (A) paragraphs 28-158 figures 1-4 English.

Kim Hyun et al. Pixel and Organic Light Emittng Display Device Including the Same Jan. 17, 2017 Samsung Display Co Td KR20170005945 (A) paragraphs 28-158 figures 1-4 Korean.

An office Action issued in Chinese Patent Application No. 201980096193.6 on Jan. 18, 2024.

* cited by examiner

<HIGH-FREQUENCY DRIVING>

<LOW-FREQUENCY DRIVING>

PIXELS, DISPLAY DEVICE COMPRISING PIXELS, AND DRIVING METHOD THEREFOR

CROSS-REFERENCE TO RELATED APPLICATION(S)

This application is a continuation application of U.S. patent application Ser. No. 17/609,122 filed on Nov. 5, 2021, which is a U.S. national phase application of International Patent Application No. PCT/KR2019/015203, filed on Nov. 8, 2019, which claims priority to Korean Patent Application No. 10-2019-0053918, filed on May 8, 2019, and all the befits accruing therefrom under 35 U.S.C. § 119, the content of which in its entirety is herein incorporated by reference.

BACKGROUND

1. Technical Field

The present disclosure relates to a pixel, a display device including the pixel, and a method of driving the display device.

2. Background Art

A display device includes pixels connected to data lines and scan lines. Each pixel commonly includes a light emitting element and a driving transistor for controlling an amount of a current flowing to the light emitting element. The driving transistor controls an amount of a current flowing from a first driving power source through the light emitting element to a second driving power source in response to a data signal. In this case, the light emitting element generates light of a certain brightness corresponding to the amount of the current from the driving transistor.

A method of implementing high brightness by setting a voltage of the second driving power source to a low level or minimizing power consumption by driving the display device at a low frequency is used these days. However, in the case of setting the second driving power source to a low level or driving the display device at a low frequency, a certain leakage current is generated in the driving transistor. In this case, the voltage of the data signal is not maintained during a single frame, and accordingly, an image with a desired brightness is not displayed.

SUMMARY The present disclosure is directed to a pixel, a display device including the pixel, and a method of driving the display device, which may display an image with a desired brightness by minimizing a leakage current in a driving transistor.

The present disclosure is also directed to a pixel, a display device including the pixel, and a method of driving the display device, which may prevent deterioration of a light emitting element and a brightness deviation due to an IR drop of a driving power source.

According to an embodiment of the present disclosure, a pixel includes a first transistor connected between a first power source and a fourth node and having a gate electrode connected to a first node, a second transistor connected between a third node and a data line and turned on in response to a scan signal applied to an i-th first scan line, where i is a natural number, a third transistor connected between the first node and the fourth node and turned on in response to a scan signal applied to an i-th third scan line, where i is a natural number, a fourth transistor connected between the second node and an initialization voltage and turned on in response to a scan signal applied to an i-th second scan line, where i is a natural number, a first capacitor connected between the third node and the first node, a second capacitor connected between the first node and the second node, and an organic light emitting diode connected between the second node and a second power source, wherein the third transistor may be an N-type transistor.

At least one of the second transistor and the fourth transistor may be the N-type transistor.

The fourth transistor may be the N-type transistor, and the i-th second scan line may be the same scan line as an (i+1)-th third scan line.

The second transistor may be the N-type transistor, and the i-th first scan line may be the same scan line as the i-th third scan line.

The fourth transistor may be the N-type transistor, and the i-th second scan line may be the same scan line as the (i+1)-th third scan line.

The i-th second scan line may be the same scan line as an (i+1)-th first scan line.

The pixel may further include a fifth transistor connected between a reference voltage and the third node and turned on in response to a light emission signal applied to a light emission control line, and a sixth transistor connected between the fourth node and the second node and turned on in response to the light emission signal applied to the light emission control line.

The second transistor and the third transistor may be turned on for a first period, and the fourth transistor may be turned on for a second period subsequent to the first period.

The second transistor and the third transistor may be turned on during a first period, the fourth transistor may be turned on during a second period subsequent to the first period, and the fifth transistor and the sixth transistor may be turned on during an emission period subsequent to the second period.

According to an embodiment of the present disclosure, a display device includes pixels connected to scan lines and data lines, a scan driver supplying a scan signal to the scan lines, and a data driver supplying a data signal to the data lines, wherein at least one of the pixels, which is connected to an i-th horizontal line, where i is a natural number, includes a first transistor connected between a first power source and a fourth node and having a gate electrode connected to a first node, a second transistor connected between a third node and a data line and turned on in response to a scan signal applied to an i-th first scan line, where i is a natural number, a third transistor connected between the first node and the fourth node and turned on in response to a scan signal applied to an i-th third scan line, a fourth transistor connected between the second node and an initialization voltage and turned on in response to a scan signal applied to an i-th second scan line, a first capacitor connected between the third node and the first node, a second capacitor connected between the first node and the second node, and an organic light emitting diode connected between the second node and a second power source, wherein the third transistor may be an N-type transistor.

The scan driver may supply a scan signal with one of a first polarity or a second polarity opposite the first polarity to the first to third scan lines.

The display device may further include an emission driver supplying a light emission signal to light emission control lines, and the at least one pixel may further include a fifth transistor connected between a reference voltage and the third node and turned on in response to the light emission signal applied to the light emission control line, and a sixth transistor connected between the fourth node and the second node and turned on in response to the light emission signal applied to the light emission control line.

The scan driver may set a scan signal applied to the first scan line and the third scan line during a first period to a turn-on level and set a scan signal applied to the second scan line during a second period subsequent to the first period to a turn-on level.

The scan driver may set a scan signal applied to the first scan line and the third scan line during a first period to a turn-on level, set a scan signal applied to the second scan line during a second period subsequent to the first period to a turn-on level, and set the light emission signal to a turn-on level during an emission period subsequent to the second period.

According to an embodiment of the present disclosure, a method of driving a display device including a plurality of pixels, at least one of the pixels, which is connected to an i-th horizontal line, where i is a natural number, including a first transistor connected between a first power source and a fourth node and having a gate electrode connected to a first node, a second transistor connected between a third node and a data line and turned on in response to a scan signal applied to an i-th first scan line, where i is a natural number, a third transistor connected between the first node and the fourth node and turned on in response to a scan signal applied to an i-th third scan line, where i is integer natural number, a fourth transistor connected between the second node and an initialization voltage and turned on in response to a scan signal applied to an i-th second scan line, where i is integer natural number, a first capacitor connected between the third node and the first node, a second capacitor connected between the first node and the second node, and an organic light emitting diode connected between the second node and a second power source, includes turning on the second transistor and the third transistor during a first period, and turning on the forth transistor during a second period subsequent to the first period.

The third transistor may be an N-type transistor.

The at least one pixel may further include a fifth transistor connected between a reference voltage and the third node and turned on in response to the light emission signal applied to the light emission control line, and a sixth transistor connected between the fourth node and the second node and turned on in response to the light emission signal applied to the light emission control line, and the method may further include turning on the fifth transistor and the sixth transistor during an emission period subsequent to the second period.

According to the present disclosure, a pixel, a display device including the pixel, and a method of driving the display device may improve driving reliability and power consumption by minimizing a leakage current in a driving transistor.

Furthermore, the pixel, the display device including the pixel, and the method of driving the display device may improve a deterioration of a light emitting element and brightness deviation due to IR drop of a driving power source.

DETAILED DESCRIPTION OF THE EMBODIMENTS

Figure 1:
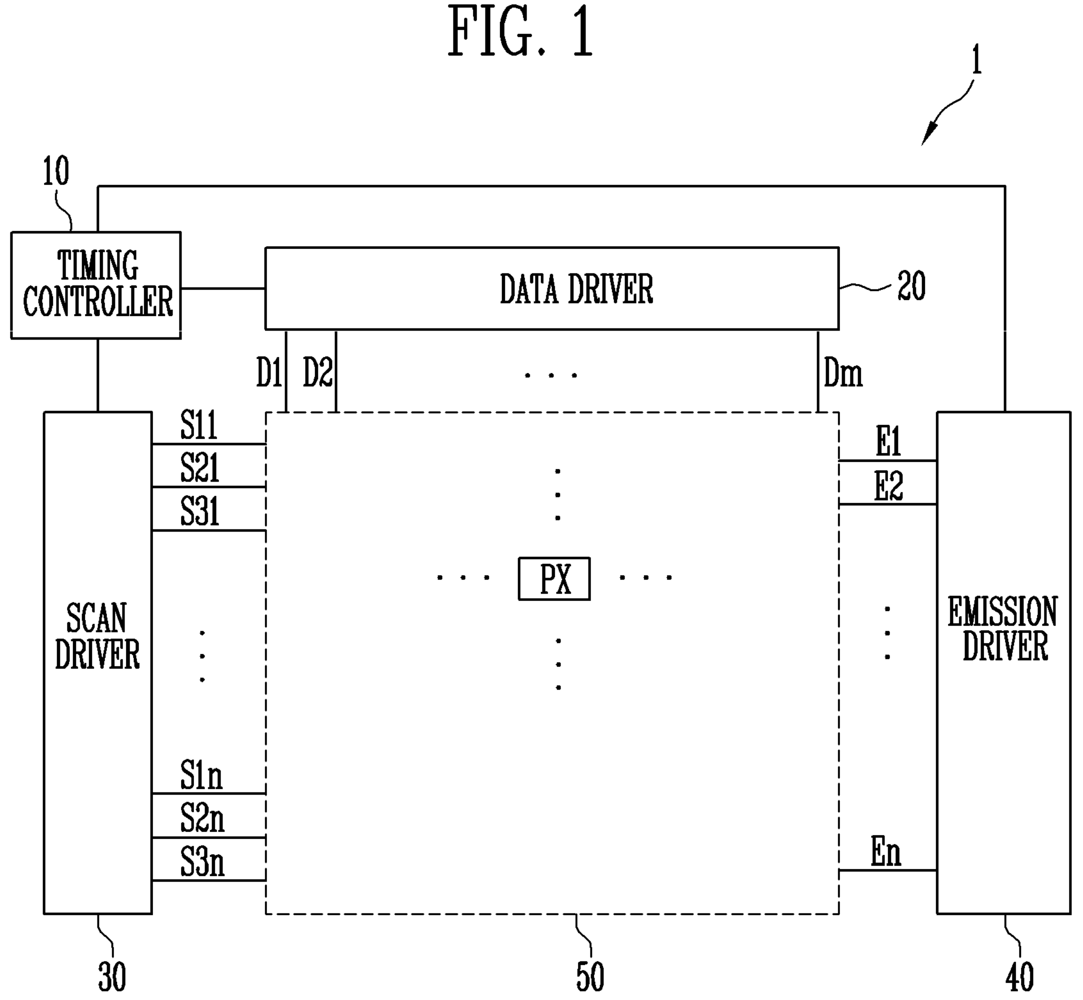
FIG. 1 is a block diagram of a display device, according to an embodiment of the present disclosure.

Embodiments of the present disclosure will now be described in detail with reference to accompanying drawings. Like elements in the drawings use identical or similar reference numerals.

FIG. 1 is a block diagram of a display device, according to an embodiment of the present disclosure.

Referring to FIG. 1, a display device 1 according to an embodiment of the present disclosure may include a timing controller 10, a data driver 20, a scan driver 30, an emission driver 40, and a display 50.

The timing controller 10 may provide grayscale values and control signals to the data driver 20 which suit for specifications of the data driver 20. The timing controller 10 may also provide a clock signal, a start scanning signal, etc., to the scan driver 30 which suit for specifications of the scan driver 30. The timing controller 10 may also provide a clock signal, a stop light emission signal, etc., to the emission driver 40 which suit for specifications of the emission driver 40.

The data driver 20 may use the grayscale values and control signals received from the timing controller 10 to generate data voltages to be provided to data lines D1 to Dm.

For example, the data driver may use the clock signal to sample the grayscale values and apply data voltages corresponding to the grayscale values to the data lines D1 to Dm one pixel row at a time, here 'm' may be a natural number.

The scan driver 30 may receive the clock signal, the start scanning signal, etc., from the timing controller 10 to generate scan signals to be provided to scan lines S11 to S1*n*, S21 to S2*n* and S31 to S3*n*, here 'n' may be a natural number.

For example, the scan driver 30 may include shift registers, and may generate scan signals in a manner that sequentially delivers a turn-on level pulse of the start scanning signal to the next stage under the control of the clock signal.

In various embodiments of the present disclosure, the scan driver 30 may provide scan signals having opposite electrical polarities. The term polarity may refer to a logic level of the pulse. For example, the scan driver 30 may provide scan signals with a first polarity to at least some of the first to third scan lines S11 to S1*n*, S21 to S2*n* and S31 to S3*n* and scan signals with a second polarity opposite the first polarity to the some others. For this, the scan driver 30 may have first stages for providing the first polarity scan signals and second stages for providing the second polarity scan signals.

In an embodiment, the first polarity scan signals provided to the at least some of the first to third scan lines S11 to S1*n*, S21 to S2*n* and S31 to S3*n* may have identical or different waveforms. Alternatively, each of the first polarity scan signals may be a delayed scan signal from a previous scan signal.

In an embodiment, the second polarity scan signal provided to some others of the first to third scan lines S11 to S1*n*, S21 to S2*n* and S31 to S3*n* may have an opposite phase to one of the first polarity scan signals.

When a pulse has the first polarity, the pulse may have a gate-on voltage at a low level. When the gate-on voltage having the low level is supplied to a gate electrode of a P-type transistor, the P-type transistor may be turned on. It is assumed that a voltage at a sufficiently high level is applied to a source electrode of the P-type transistor as compared to the gate electrode. For example, the P-type transistor may be a P-channel metal oxide semiconductor (PMOS).

When a pulse has the second polarity, the pulse may have a gate-on voltage at a high level. When the gate-on voltage having the high level is applied to a gate electrode of an N-type transistor, the N-type transistor may be turned on. It is assumed that a voltage at a sufficiently low level is applied to a source electrode of the N-type transistor as compared to the gate electrode. For example, the N-type transistor may be an N-channel metal oxide semiconductor (NMOS).

The emission driver 40 may receive the clock signal, the stop light emission signal, etc., from the timing controller 10 to generate light emission signals to be provided to light emission control lines E1 to En. For example, the emission driver 40 may sequentially provide light emission signals having a turn-off level to the light emission control lines E1 to En. For example, the emission driver 40 may include shift registers, and may generate light emission signals in a manner that sequentially delivers a turn-off level pulse of the stop light emission signal to the next light emission stage under the control of the clock signal.

The display 50 includes pixels PX. For example, each of the pixels PX may be connected to a corresponding data line, first to third scan lines S11 to S1*n*, S21 to S2*n* and S31 to S3*n*, and a light emission control line En.

Although there are n first to third scan lines S11 to S1*n*, S21 to S2*n* and, S31 to S3*n* and *n* light emission control lines E1 to En shown in FIG. 1, the present disclosure is not limited thereto. For example, in various embodiments of the present disclosure, pixels located on a current horizontal line according to a circuit structure of the pixels PX may be additionally connected to a scan line located on a previous or subsequent horizontal line. For this, dummy scan lines and/or dummy light emission control lines (not shown) may be additionally formed for the display 50.

Although there are the first scan lines S11 to S1*n*, second scan lines S21 to S2*n* and third scan lines S31 to S3*n* shown in FIG. 1, the technical idea of disclosure is not limited thereto. For example, in various embodiments, only one or two of the first scan lines S11 to S1*n*, second scan lines S21 to S2*n* and third scan lines S31 to S3*n* may be arranged for the display device 1 according to a circuit structure of the pixels PX.

Furthermore, although the light emission control lines E1 to En are shown in FIG. 1, the present disclosure is not limited thereto. For example, in various embodiments, inverted light emission control lines (not shown) may be additionally formed according to a circuit structure of the pixels PX. The inverted light emission control lines may receive an inverted light emission signal, which is inverted from the light emission signal.

Figure 2:
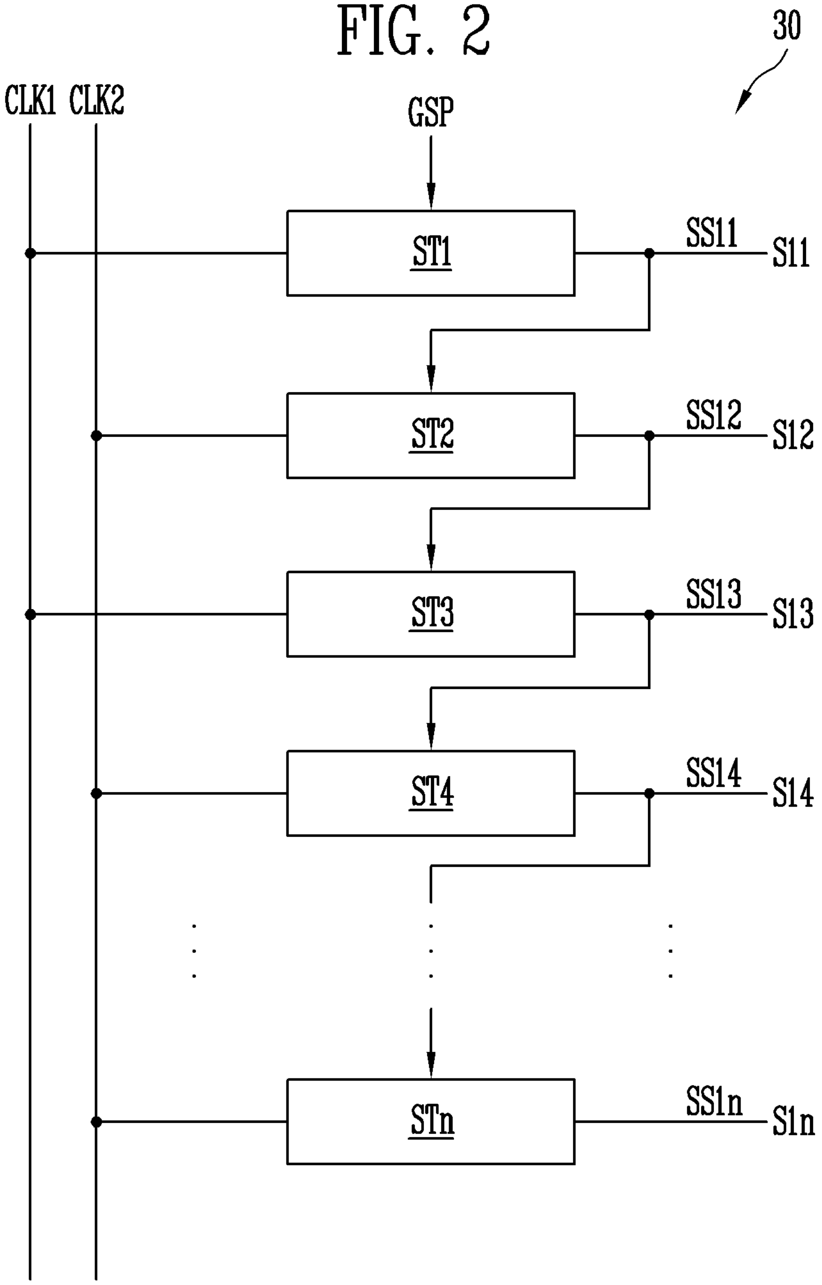
FIG. 2 is a schematic diagram of a scan driver shown in FIG. 1.
Figure 3:
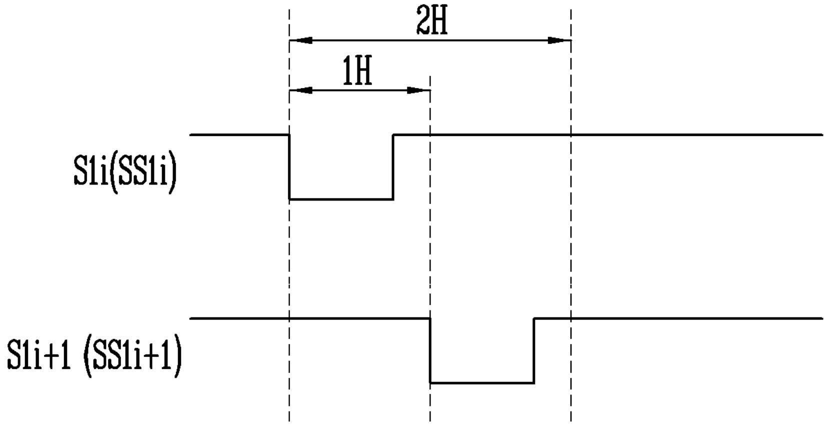
FIG. 3 shows an example of scan signals output from the scan driver shown in FIG. 1.

FIG. 2 is a schematic diagram of a scan driver shown in FIG. 1, and FIG. 3 shows an example of scan signals output from the scan driver shown in FIG. 1. In FIGS. 2 and 3, n (n is a natural number equal to or greater than 2) stages ST are included in the scan driver 30, for example. Although an embodiment in which the scan driver 30 supplies the first scan signals SS11 to SS1*n* with the first polarity to the first scan lines S11 to S1*n* will now be described, the following description will be equally applied to other embodiments in which the scan driver 30 supplies the second scan signal with the first polarity and the third scan signal with the second polarity to the second scan lines S21 to S2*n* and the third scan lines S31 to S3*n*, respectively.

Referring to FIG. 2, in an embodiment of the present disclosure, the scan driver 30 includes a plurality of stages ST1 to STn. Each of the stages ST1 to STn is connected to one of the first scan lines S11 to S1*n*, for supplying the first scan signals SS11 to SS1*n* to the first scan lines S11 to S1*n* in response to a start scanning signal GSP. Here, an i-th (i is a natural number) stage STi may supply the first scan signal SS1*i* to the i-th first scan line S1*i*.

The first stage ST1 supplies the first scan signal SS11 to the first scan line S11 connected thereto in response to the start scanning signal GSP. The other stages ST2 to STn supply a scan signal SS12 to SS1*n* to the first scan line (one of S12 to S1*n*) connected thereto in response to an output signal (i.e., the first scan signal) supplied from their previous stage. For example, the i-th stage STi may supply the first scan signal SS1*i* to the i-th first scan line S1*i* in response to the first scan signal SS1*i*-1 supplied from the (i−1)-th stage STi−1.

The scan driver 30 may receive clock signals CLK1 and CLK2. Although an example of supplying the first clock signal CLK1 and the second clock signal CLK2 is shown in FIG. 2, the present disclosure is not limited thereto and there may be more than two clock signals supplied to the scan driver depending on the implementation.

The first clock signal CLK1 and the second clock signal CLK2 are supplied to different stages ST. For example, the first clock signal CLK1 may be supplied to odd numbered stages and the second clock signal CLK2 may be supplied to even numbered stages. Alternatively, the second clock signal CLK2 may be supplied to odd numbered stages and the first clock signal CLK1 may be supplied to even numbered stages. The first clock signal CLK1 and the second clock signal CLK2 may be supplied to the first scan lines S11 to S1*n* as the first scan signal SS1.

The first clock signal CLK1 and the second clock signal CLK2 are square wave signals that includes gate-on voltages (e.g., a low level voltage) and gate-off voltages (e.g., a high level voltage) disposed alternatingly. In a single cycle of the first clock signal CLK1 and the second clock signal CLK2, the gate-on voltage period may be set to be shorter than the gate-off voltage period. The gate-on voltage period may correspond to a width of the first scan signal SS1, which may be variously set according to the circuit configuration of the pixel PX.

The first clock signal CLK1 and the second clock signal CLK2 may have the same cycle, for example, two periods (e.g., 2H) and may be shifted one horizontal period (1H) form each other. For example, the first clock signal CLK1 and the second clock signal CLK2 may have phases, one of which is shifted from the earlier clock signal by the one horizontal period (1H). Specifically, when the first clock signal CLK1 and the second clock signal CLK2 are supplied sequentially, the phase of the second clock signal CLK2 may be shifted by the one horizontal period (1H) from the first clock signal CLK1.

As described above, in an embodiment of the present disclosure, the gate-on voltage period of the first clock signal CLK1 and the second clock signal CLK2 may be shorter than the gate-off voltage period. For example, when the first and second clock signals CLK1 and CLK2 have a cycle of 2H, the gate-on voltage period of the first and second clock signals CLK1 and CLK2 may be shorter than 1H. In this embodiment, the first clock signal CLK1 and the second clock signal CLK2 may be shifted one horizontal period (1H). Based on the clock signals CLK1 and CLK2 set as described above, the first scan signals SS1*i* and SS1*i*+1 output to the i-th first scan line S1*i* and the (i+1)-th first scan line S1*i*+1 have waveforms as shown in FIG. 3.

The present disclosure is not limited thereto. For example, in various embodiments, when the gate-on voltage period of transistors in a pixel circuit is set to be a low level voltage period in the first and second clock signals CLK1 and CLK2, a rising edge of the first scan signal SS1*i* output to the i-th first scan line S1*i* is in synchronization with a falling edge of the first scan signal SS1*i*+1 output to the (i+1)-th first scan line S1*i*+1.

In the following embodiments, assume that the first scan signals SS11 to SS1*n* output to the first scan lines S11 to S1*n* have the waveforms as shown in FIG. 3. It is not, however, limited thereto, and waveforms of the scan lines, as will be described later, may be variously changed to an extent that does not deviate from the scope of the present disclosure.

Figure 4:
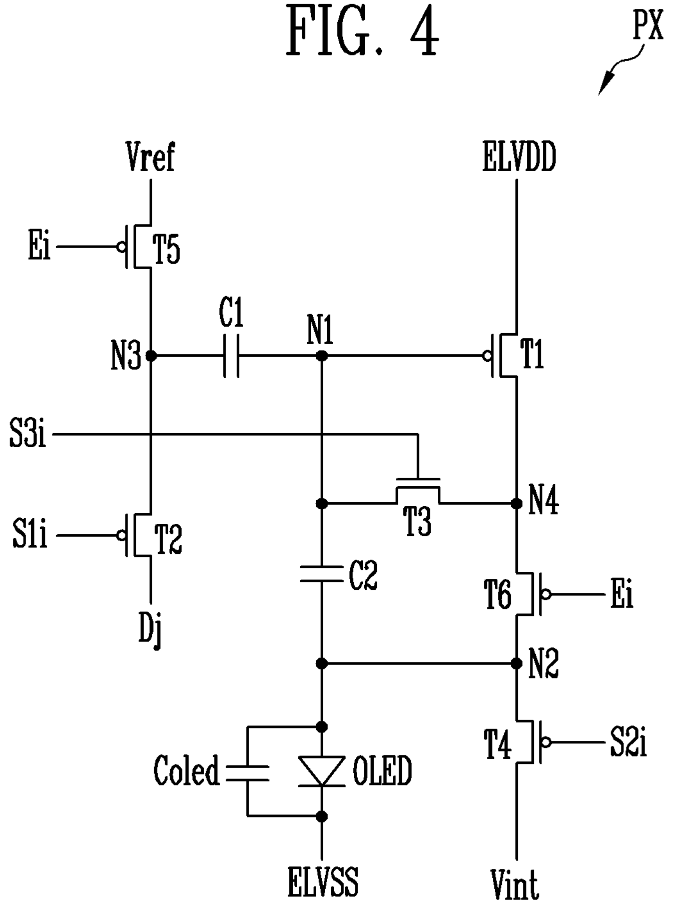
FIG. 4 is a circuit diagram of a pixel, according to a first embodiment of the present disclosure.

FIG. 4 is a circuit diagram of a pixel, according to a first embodiment of the present disclosure. In FIG. 4, for convenience of explanation, the pixel PX located on an i-th horizontal line and connected to a j-th data line Dj will be taken as an example.

Referring to FIG. 4, the pixel PX includes first to sixth transistors T1 to T6, first and second capacitors C1 and C2, and an organic light emitting diode OLED.

The first transistor T1 is connected between a first driving power source ELVDD and a terminal of the sixth transistor T6, i.e., a fourth node N4. A gate electrode of the first transistor T1 is connected to a first node N1. The first transistor T1 may be turned on according to a voltage applied to the first node N1 to control an amount of a current flowing from the first driving power source ELVDD to the organic light emitting diode OLED through the sixth transistor T6. In various embodiments of the present disclosure, the first transistor T1 may be termed as a driving transistor.

The second transistor T2 is connected between a third node N3 and a data line Dj. A gate electrode of the second transistor T2 is connected to the first scan line S1*i*. The second transistor T2 may be turned on in response to a first scan signal applied to the first scan line S1*i*. When the second transistor T2 is turned on, a data signal applied to the data line Dj may be supplied to the third node N3.

The third transistor T3 is connected between the first node N1 and the fourth node N4. A gate electrode of the third transistor T3 is connected to the third scan line S3*i*. The third transistor T3 may be turned on in response to a third scan signal applied to the third scan line S3*i*.

The fourth transistor T4 is connected between a second node N2 and an initialization voltage Vint. A gate electrode of the fourth transistor T4 is connected to the second scan line S2*i*. The fourth transistor T4 may be turned on in response to a second scan signal applied to the second scan line S2*i*. When the fourth transistor T4 is turned on, the initialization voltage Vint may be applied to the second node N2, i.e., an anode electrode of the organic light emitting diode OLED.

In various embodiments of the present disclosure, the initialization voltage Vint may have a lower voltage value than the second driving power source ELVSS. For example, the initialization voltage Vint may be −3.5 V, without being limited thereto.

The fifth transistor T5 is connected between a reference voltage Vref and the third node N3. A gate electrode of the fifth transistor T5 is connected to a light emission control line Ei. The fifth transistor T5 may be turned on in response to a light emission control signal supplied to the light emission control line Ei. When the fifth transistor T5 is turned on, the reference voltage Vref may be applied to the third node N3. As the reference voltage Vref is applied to the third node N3, the voltage at the third node N3 may be stably maintained even when the first capacitor C1 is floated, and as a result, a gate voltage of the first transistor T1 (i.e., a voltage at the first node N1) may be stably maintained in conjunction with the second capacitor C2.

In various embodiments of the present disclosure, the reference voltage Vref may have a positive voltage value or a negative voltage value, but the specific value is not particularly limited.

The sixth transistor T6 is connected between the fourth node N4 and the second node N2. A gate electrode of the sixth transistor T6 is connected to the light emission control line Ei. The sixth transistor T6 may be turned on in response to a light emission signal supplied to the light emission control line Ei. When the sixth transistor T6 is turned on, the fourth node N4 and the second node N2 may be electrically connected to each other.

The first capacitor C1 is connected between the first node N1 and the third node N3. The first capacitor C1 may store a voltage corresponding to a voltage difference between the first node N1 and the third node N3. In other words, the first capacitor C1 may control a voltage across the first and third nodes N1 and N3. In various embodiments of the present disclosure, the first capacitor C1 may be termed a storage capacitor.

The second capacitor C2 is connected between the first node N1 and the second node N2. The second capacitor C2 may store a voltage corresponding to a voltage difference between the first node N1 and the second node N2. In other words, the second capacitor C2 may control a voltage across the first and second nodes N1 and N2.

In various embodiments of the present disclosure, the second capacitor C2 may control the voltage at the second node N2 in consideration of a threshold voltage of the organic light emitting diode OLED, and control the voltage at the first node N1 according to the second node N2 voltage in conjunction with the first capacitor C1. The threshold voltage of the organic light emitting diode OLED may increase as the organic light emitting diode OLED deteriorates, and accordingly, an amount of a current required for the organic light emitting diode OLED to emit light with uniform brightness may increase. In various embodiments of the present disclosure, the second capacitor C2 may control voltages at both terminals (the first node N1 and the second node N2) in consideration of the threshold voltage of the organic light emitting diode OLED for a data write period as will be described later, and allow the voltage at the first node N1 to be controlled by reflecting the threshold voltage of the organic light emitting diode OLED for an emission period. Then, the gate-source voltage Vgs of the first transistor T1 is controlled so that an amount of a current flowing to the organic light emitting diode OLED may be controlled. Accordingly, in the present disclosure, deterioration of the organic light emitting diode OLED is compensated and the organic light emitting diode OLED may emit light with a desired brightness.

The organic light emitting diode OLED has an anode electrode connected to the second node N2 and a cathode electrode connected to the second driving power source ELVSS. The second driving power source ELVSS may be set to be lower than the first driving power source ELVDD and higher than the initialization voltage Vint. In various embodiments of the present disclosure, the second driving power source ELVSS may be set to −2.6 V, without being limited thereto.

The organic light emitting diode OLED may include an internal parasitic capacitor Coled (hereinafter, referred to as an organic capacitor). When the initialization voltage Vint is applied to the anode electrode of the organic light emitting diode OLED through the fourth transistor T4, the organic capacitor Coled is discharged, thereby improving the black representation ability of the pixel PX.

Specifically, the organic capacitor Coled is charged with a certain voltage corresponding to a current supplied for the previous frame period. Once the organic capacitor Coled is charged, the organic light emitting diode OLED may easily emit light even with a low current.

In the meantime, a black data signal may be supplied to the pixel PX for the current frame period. When the black data signal is supplied, ideally, a current should not flow through the organic light emitting diode OLED. However, in the pixel PX made up with transistors, a certain leakage current may be supplied to the organic light emitting diode OLED even though the black data signal is supplied. In this case, when the organic capacitor Coled is in a charged state, the organic light emitting diode OLED may emit infinitesimal light, thereby degrading the black representation ability.

On the other hand, as in the present disclosure, when the organic capacitor Coled is discharged by the initialization voltage Vint, the organic light emitting diode OLED is set into a non-emission state even though the leakage current is applied thereto. Accordingly, in the present disclosure, the initialization voltage Vint may be used to discharge the organic capacitor Coled, thereby improving the black representation ability.

In the embodiment as shown in FIG. 4, the pixel PX includes an oxide semiconductor thin film transistor and a low temperature poly-silicon (LTPS) thin film transistor.

The oxide semiconductor thin film transistor includes a gate electrode, a source electrode, and a drain electrode. The oxide semiconductor thin film transistor has an active layer formed with an oxide semiconductor. The oxide semiconductor may be set as an amorphous or crystalline oxide semiconductor. The oxide semiconductor thin film transistor may be formed of an N-type transistor. The oxide semiconductor thin film transistor may be processed at a low temperature and has a lower charge mobility than the LTPS thin film transistor. The oxide semiconductor thin film transistor has good off-current characteristics.

The LTPS thin film transistor includes a gate electrode, a source electrode, and a drain electrode. The LTPS thin film transistor may have an active layer formed with poly-silicon. The LTPS thin film transistor may be formed of a P-type thin film transistor or an N-type thin film transistor. In an embodiment of the present disclosure, assume that the LTPS thin film transistor is formed of the P-type transistor. The LTPS thin film transistor has high electron mobility, and thus has fast driving characteristics.

In the embodiment of FIG. 4, the third transistor T3 is formed of oxide semiconductor thin film transistors, and the first, second, fourth, fifth, and sixth transistors T1, T2, T4, T5 and T6 are formed of LTPS thin film transistors. Accordingly, in the embodiment of FIG. 4, first and second scan signals supplied to gate electrodes of the second and fourth transistors T2 and T4 may have the first polarity, and a third scan signal applied to the third transistor T3 may have the second polarity.

In various embodiments of the present disclosure, the third transistor T3 is formed of a semiconductor thin film transistor having good off-current characteristics, i.e., an N-type transistor. Accordingly, when the first transistor T1 is driven to supply a current to the organic light emitting diode OLED from the first driving power source ELVDD via the sixth transistor T6, a leakage current may be efficiently prevented from being generated through the third transistor T3.

The present disclosure is not, however, limited thereto, and transistors of the pixel PX may be variously arranged and the signals supplied to the pixel PX may be changed accordingly.

Figure 5:
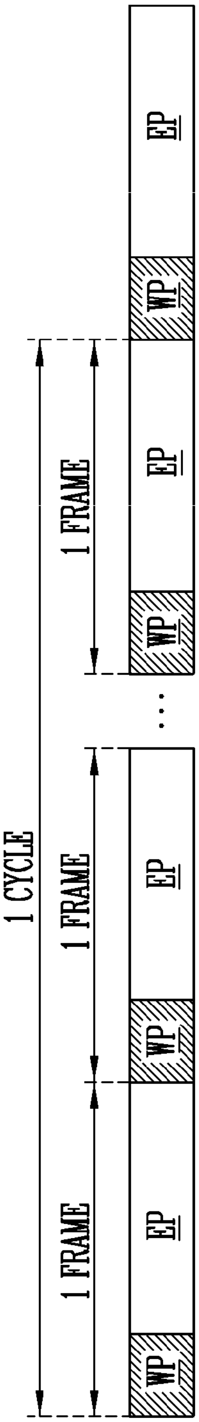
FIG. 5 is a diagram for describing a high frequency operation of a display device, according to an embodiment of the present disclosure.
Figure 6:
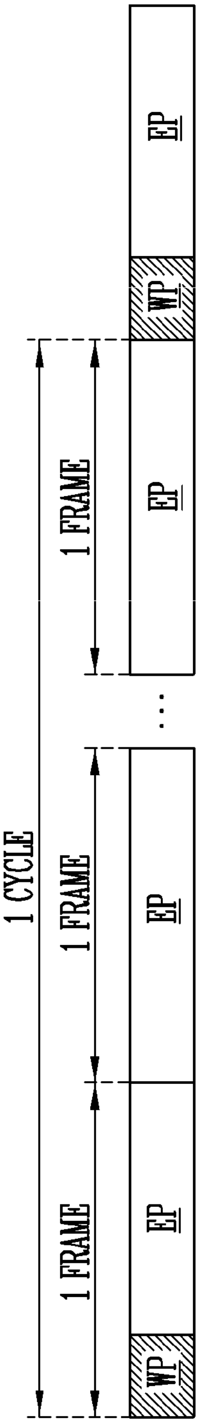
FIG. 6 is a diagram for describing a low frequency operation, according to an embodiment of the present disclosure.

FIG. 5 is a diagram for describing a high frequency operation of a display device, according to an embodiment of the present disclosure, and FIG. 6 is a diagram for describing a low frequency operation, according to an embodiment of the present disclosure.

When the display device is operated in a high-frequency driving method, the display device may be expressed to be in a first driving mode. Furthermore, when the display device is operated in a low-frequency driving method, the display device may be expressed to be in a second driving mode.

The first driving mode may be a normal driving mode. Specifically, when the user uses the display device, frames may be displayed at 20 Hz or higher, e.g., 60 Hz.

The second driving mode may be a low-power driving mode. For example, when the user is not using the display device, frames may be displayed at less than 20 Hz, e.g., 1 Hz. For example, an occasion when only a time and a date are displayed in the 'always on mode' of commercial modes may correspond to the second driving mode.

In the first driving mode, one cycle may include a plurality of frames. The one cycle is a period defined arbitrarily for comparison with the second driving mode. The one cycle may refer to the same time interval as in the first and second driving modes.

In the first driving mode, each frame may include a data write period WP and an emission period EP.

In the second driving mode, a first frame in the one cycle includes a data write period WP and an emission period EP, and the other frames in the one cycle each include an emission period EP only. The pixel PX may display the same image during the one cycle based on a data voltage applied during the data write period WP of the first frame in the one cycle.

Referring to FIG. 4, during the data write period WP in the first and second driving mode, first to third scan signals may be supplied to the first to third scan lines S1*i*, S2*i* and S3*i*, a data signal is supplied to the data line Dj, and in response, voltages for the first to third nodes N1 to N3, and the first capacitor C1 and the second capacitor C2 may be set. During the emission period EP in the first and second driving modes, a light emission signal is supplied to the light emission control line Ei and the organic light emitting diode OLED may emit light based on the voltages of the first to third nodes N1 to N3, and the first capacitor C1 and the second capacitor C2 set during the data write period WP.

Figure 7:
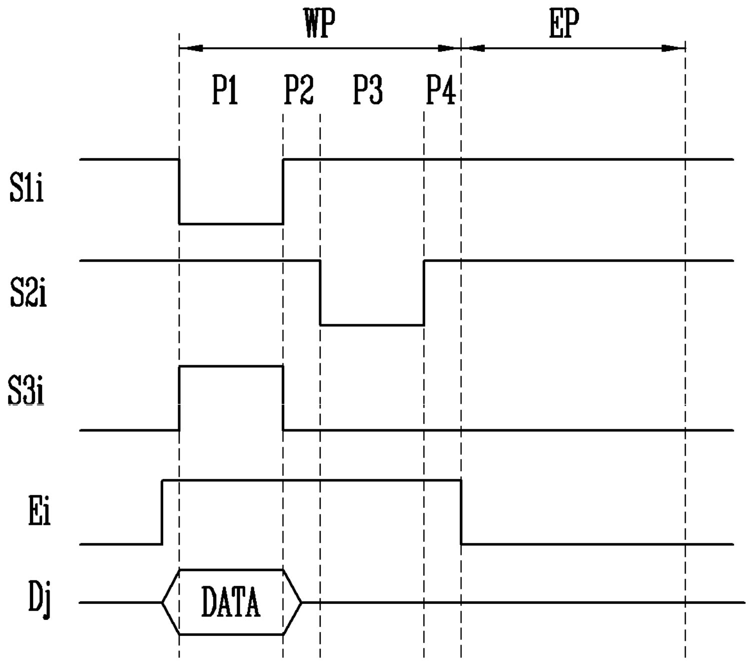
FIG. 7 is a timing diagram representing a method of driving a display device, according to the first embodiment of the present disclosure.

FIG. 7 is a timing diagram representing a method of driving a display device, according to the first embodiment of the present disclosure, and FIGS. 8 to 12 are equivalent circuits of a pixel in respective periods of the timing diagram shown in FIG. 7, according to an embodiment of the present disclosure.

In FIGS. 7 to 12, in the high-frequency operation as shown in FIG. 5 and the low-frequency operation as shown in FIG. 6, operation in an arbitrary frame including the data write period WP and the emission period EP is shown. The arbitrary frame may be one of a plurality of frames that make up one cycle in the high-frequency operation or the first of the plurality of frames that make up one cycle in the low-frequency operation.

Furthermore, in FIGS. 7 to 12, a method of driving the pixel PX connected to an i-th horizontal line and a j-th data line Dj as shown in FIG. 4 will be taken as a representative example. Accordingly, in FIG. 7, scan signals supplied to the first to third scan lines S1*i*, S2*i* and S3*i*, a light emission signal supplied to the light emission control line Ei and a data signal supplied to the data line Dj are shown as an example. In the first embodiment of the present disclosure, scan signals with a first polarity may be supplied to the first and second scan lines S1*i* and S2*i*, and a scan signal with a second polarity may be supplied to the third scan line S3*i*.

In various embodiments of the present disclosure, the data write period WP may include a first period P1, a second period P2, a third period P3 and a fourth period P4. In various embodiments, a voltage corresponding to the data signal and a voltage to compensate for the threshold voltage of the organic light emitting diode OLED may be written to the pixel PX for the first period P1. During the third period P3, a voltage of the anode of the organic light emitting diode OLED may be initialized. During the emission period EP, the organic light emitting diode OLED may emit light based on the data voltage and the threshold voltage compensation value for the organic light emitting diode OLED written in the data write period WP.

A driving method in the data write period WP and the emission period EP will now be described in detail.

Figure 8:
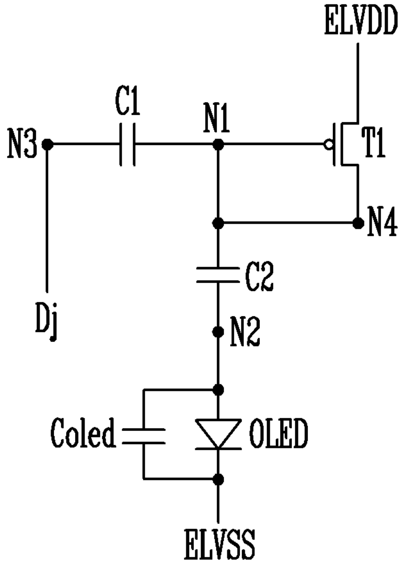
FIGS. 8, 9, 10, 11 and 12 are equivalent circuits of a pixel in respective periods of the timing diagram shown in FIG. 7, according to an embodiment of the present disclosure.

Referring to FIGS. 4, 7, and 8 together, during the first period P1, a first scan signal of a low level is supplied to the first scan line S1*i*, and second and third scan signals of a high level are supplied to the second and third scan lines S2*i* and S3*i*, respectively. In response to the first scan signal and the third scan signal, the second transistor T2 and the third transistor T3 are turned on, respectively, and in response to the second scan signal, the fourth transistor T4 is turned off.

Furthermore, during the first period P1, a light emission signal of the high level is supplied through the light emission control line Ei to the fifth transistor T5 and the sixth transistor T6. The fifth transistor T5 and the sixth transistor T6 are turned off in response to the light emission signal.

FIG. 8 represent an equivalent circuit of the first period P1. During the first period P1, since the second transistor T2 is turned on, a data signal DATA in the current frame is supplied through the data line Dj and the third node N3 is set to have a data voltage Vdata corresponding to the data signal DATA.

During the first period P1, the first transistor T1 keeps in the turn-on state and is diode-connected, so a current is supplied to the fourth node N4 from the first driving power source ELVDD. The first node N1 is then set to have a voltage dropped by the threshold voltage Vth of the first transistor T1 from the voltage of the first driving power source ELVDD.

The second node N2 is set to have a voltage increased by a threshold voltage of the organic light emitting diode OLED Voled,th.

According to what are described above, during the first period P1, voltages VN1, VN2 and VN3 of the first to third nodes N1 to N3 may be expressed as in the following Equations 1 to 3:

$$VN1 = ELVDD - Vth \quad \text{[Equation 1]}$$

$$VN2 = Voded,th \quad \text{[Equation 2]}$$

$$VN3 = Vdata \quad \text{[Equation 3]}$$

Subsequently, referring to FIGS. 4, 7, and 9 together, during the second period P2, scan signals of a high level are supplied to the first and second scan lines S1*i* and S2*i*, and a scan signal of a low level is supplied to the third scan line S3*i*. In response to the first scan signal transitioned to the high level, the second transistor T2 is turned off, and in response to the third scan signal transitioned to the low level, the third transistor T3 is turned off.

Figure 9:
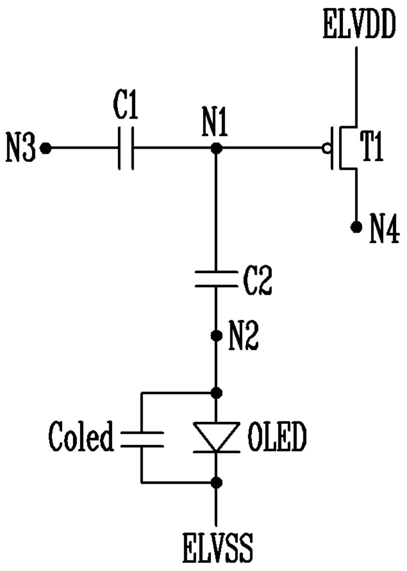

FIG. 9 represent an equivalent circuit of the second period P2. During the second period P2, the first to third nodes N1 to N3 may stably remain at the voltages set in the first period P1 due to the first capacitor C1 and the second capacitor C2.

Figure 10:
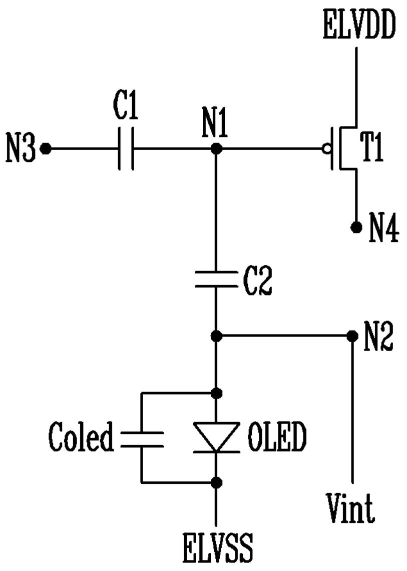

Next, referring to FIGS. 4, 7, and 10 together, during the third period P3, a first scan signal of a high level is applied to the first scan line S1*i*, and second and third scan signals of a low level are applied to the second and third scan lines S2*i* and S3*i*, respectively. The fourth transistor T4 is then turned on in response to the second scan signal transitioned to the low level.

FIG. 10 represent an equivalent circuit of the third period P3. Since the fourth transistor T4 is turned on during the third period P3, the initialization voltage Vint is applied to the second node N2. The voltage of the second node N2 is then changed to the initialization voltage Vint from the voltage maintained by the second capacitor C2 in the previous period. Accordingly, during the third period P3, voltage VN2 of the second node N2 and a variation of voltage ΔVN2 at the second node N2 may be expressed as in the following Equations 4 and 5:

$$VN2 = V\,int \quad \text{[Equation 4]}$$

$$\Delta VN2 = Voled,th - V\,int \quad \text{[Equation 5]}$$

As the voltage of the second node N2 changes, voltages at the first and third nodes N1 and N3 may be changed as well. Specifically, during the third period P3, the first node N1 and the third node N3 are in a floating state because the second transistor T2, the third transistor T3 and the fifth transistor T5 are turned off, so that, when the voltage at the second node N2 is changed, voltages at the first and third nodes N1 and N3 may also be changed as much as the variation of voltage at the second node N2 from the voltages maintained by the first capacitor C1 in the previous period. Accordingly, during the second period P2, voltages VN1 and VN3 of the first and third nodes N1 and N3 may be expressed as in the following Equations 6 and 7:

$$VN1=ELVDD-Vth-\Delta VN2 \quad \text{[Equation 6]}$$

$$VN3=Vdata-\Delta VN2 \quad \text{[Equation 7]}$$

In the meantime, when the initialization voltage Vint is applied to the second node N2, the organic capacitor Coled of the organic light emitting diode OLED may be discharged. The organic capacitor Coled is discharged during the data write period WP, thereby improving the black representation ability of the pixel PX in the subsequent emission period EP.

Subsequently, referring to FIGS. 4, 7, and 11 together, during the fourth period P4, first and second scan signals of a high level are supplied to the first and second scan lines S1*i* and S2*i*, respectively, and a third scan signal of a low level is supplied to the third scan line S3*i*. The fourth transistor T4 is then turned off in response to the second scan signal transitioned to the high level.

Figure 11:
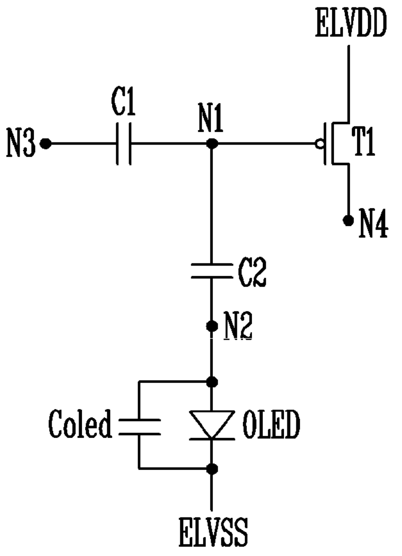

FIG. 11 represent an equivalent circuit of the fourth period P4. During the fourth period P4, the first to third nodes N1 to N3 may stably remain at the voltages set by the first capacitor C1 and the second capacitor C2 in the third period P3.

Subsequently, referring to FIGS. 4, 7, and 12 together, during the emission period EP, first and second scan signals of a high level are applied to the first and second scan lines S1*i* and S2*i*, respectively, and a third scan signal of a low level is applied to the third scan line S3*i*. In response to the first to third scan signals, the second, third, and fourth transistors T2, T3 and T4 are turned off.

Furthermore, during the emission period EP, a light emission signal of the low level is applied through the light emission control line Ei. The fifth transistor T5 and the sixth transistor T6 are then turned on in response to the light emission signal.

Figure 12:
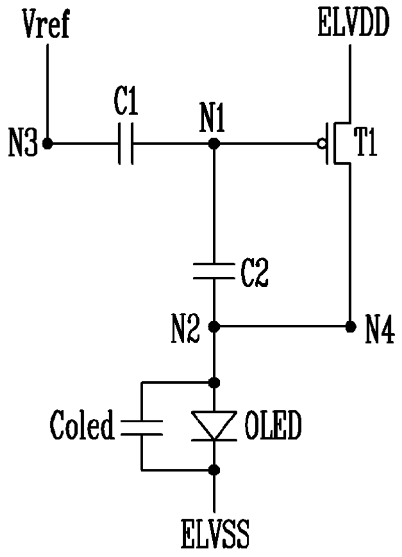

FIG. 12 represent an equivalent circuit of the emission period EP. Since the fifth transistor T5 is turned on during the emission period EP, the reference voltage Vref is applied to the third node N3 and the voltage at the third node N3 is changed to the reference voltage Vref. Accordingly, during the emission period FP, voltage VN3 of the third node N3 and a variation of voltage ΔVN3 at the third node N3 may be expressed as in the following Equations 8 and 9:

$$VN3=Vref \quad \text{[Equation 8]}$$

$$\Delta VN3=Vdata-\Delta VN2-Vref \quad \text{[Equation 9]}$$

As the voltage of the third node N3 changes, voltages at the first and second nodes N1 and N2 may be changed as well. Specifically, since the first capacitor C1 and the second capacitor C2 are connected in series during the emission period EP, a variation of voltage at the third node N3 is distributed to the first and second capacitors C1 and C2, and the voltage at the first node N1 may be changed according to the variation of voltage distributed to the first capacitor C1. Accordingly, a voltage of the first node N1 during the emission period EP is expressed as in the following Equation 10:

$$VN1 = ELVDD - Vth - \Delta VN2 - \frac{Cst}{Cst + Cself}\Delta VN3 \quad \text{[Equation 10]}$$

where Cst denotes capacitance of the first capacitor C1 and Cself denotes capacitance of the second capacitor C2.

When such a voltage is applied to the first node N1, a current corresponding to a voltage difference between the first driving power source ELVDD and the first node N1, i.e., a gate-source voltage Vgs, may flow through the first transistor T1. The current flowing through the first transistor T1 is supplied to the organic light emitting diode OLED via the sixth transistor T6 in a turn-on state. The organic light emitting diode OLED may then emit light with a brightness corresponding to an amount of the supplied current.

When the voltage VN1 of the first node N1 is controlled as in Equation 10, a current Wed flowing to the organic light emitting diode OLED is expressed as in the following Equation 11.

$$\begin{aligned} Ioled &= \frac{1}{2}\mu_p C_{ox}\frac{W}{L}(ELVDD - VN1 - Vth)^2 \\ &= \frac{1}{2}\mu_p C_{ox}\frac{W}{L}\left(ELVDD - ELVDD + Vth + \Delta VN2\frac{Cst}{Cst + Cself}\Delta VN3 - Vth\right)^2 \\ &= \frac{1}{2}\mu_p C_{ox}\frac{W}{L}\left(E + \Delta VN2\frac{Cst}{Cst + Cself}\Delta VN3\right)^2 \\ &= \frac{1}{2}\mu_p C_{ox}\frac{W}{L}\left(\frac{Cst(Vdata - Vref) + Cself(Voled,th - Vint)}{Cst + Cself}\right)^2 \end{aligned} \quad \text{[Equation 11]}$$

where μp denotes carrier mobility of the first transistor T1, $C_{ox}$ denotes gate oxide layer capacitance of the first transistor T1, and W/L denotes a ratio of width to length of the first transistor T1.

Referring to Equation 11, it may be seen that the current supplied to the organic light emitting diode OLED holed during the emission period EP is free of an effect of IR drop according to the first driving power source ELVDD and is increased by considering the threshold voltage of the organic light emitting diode OLED Voled,th.

In the meantime, the third transistor T3 remains in a turn-off state during the emission period EP. In various embodiments of the present disclosure, the third transistor T3 may be formed of the N-type transistor having good off-current characteristics. Accordingly, the driving current flowing through the first transistor T1 from the first driving power source ELVDD may be prevented from leaking through the third transistor T3 during the emission period EP.

Preventing the leakage of the driving current during the emission period EP may improve driving characteristics in the low-frequency driving mode, e.g., the "always on mode" of the display device 1. Furthermore, the prevention of the driving current leakage may lead to improvement in ability to express black gradation, color bleeding or crosstalk.

Although the data write period WP is shown as having the first to fourth periods P1 to P4 in the embodiment of FIG. 7, the present disclosure is not limited thereto. For example, when the gate-on voltage period of the clock signals for generating scan signals is set to be identical to the gate-off voltage period, the data write period WP may not include the second period P2 and the fourth period P4.

Figure 13:
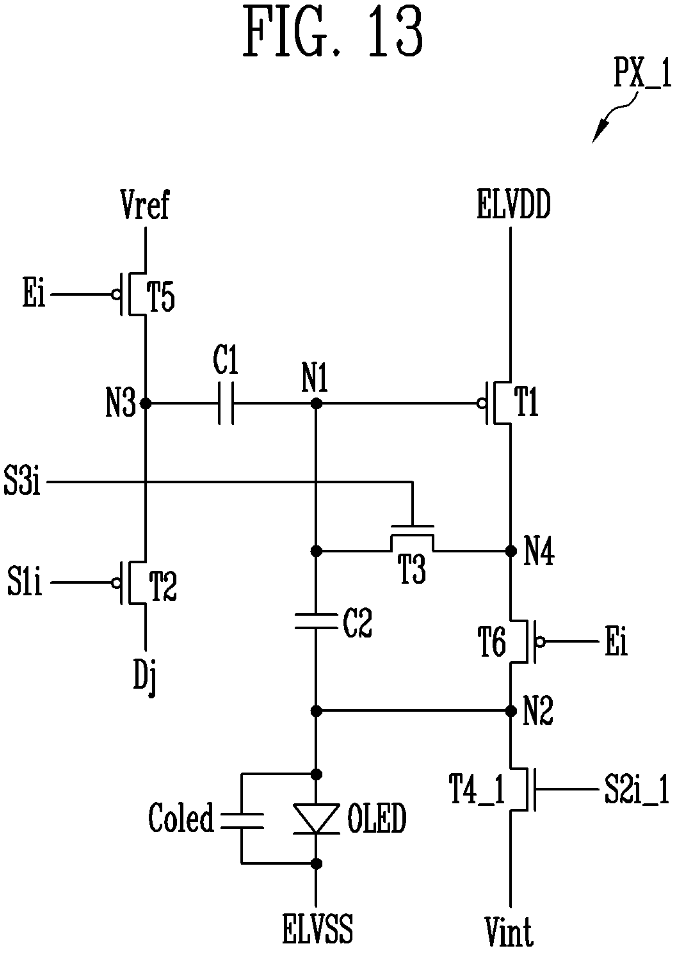
FIG. 13 is a circuit diagram of a pixel, according to a second embodiment of the present disclosure.
Figure 14:
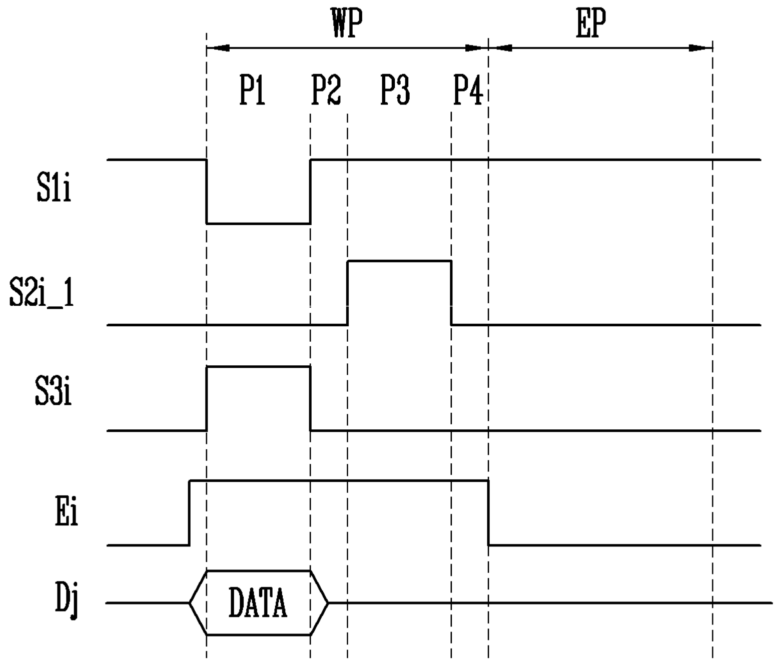
FIG. 14 is a timing diagram representing a method of driving a display device, according to the second embodiment of the present disclosure.

FIG. 13 is a circuit diagram of a pixel, according to a second embodiment of the present disclosure, and FIG. 14 is a timing diagram representing a method of driving a display device, according to the second embodiment of the present disclosure.

In FIG. 13, for convenience of explanation, pixel PX_1 located on an i-th horizontal line and connected to a j-th data line Dj will be taken as an example.

Referring to FIG. 13, the pixel PX_1 according to the second embodiment of the disclosure includes first to sixth transistors T1 to T6, first and second capacitors C1 and C2, and an organic light emitting diode OLED. The pixel PX_1 according to the second embodiment of the disclosure may be substantially the same as the pixel PX as shown in FIG. 4 except that a fourth transistor T4_1 is formed of an N-type transistor. Accordingly, in FIG. 13, the same reference numerals are allocated to the same elements as in FIG. 4, and detailed description thereof will not be repeated.

In the second embodiment of the present disclosure, the fourth transistor T4_1 is connected between the second node N2 and the initialization voltage Vint. A gate electrode of the fourth transistor T4_1 is connected to a second scan line S2*i*_1. The fourth transistor T4_1 may be turned on in response to a second scan signal applied to the second scan line S2*i*_1. When the fourth transistor T4_1 is turned on, the initialization voltage Vint may be applied to the second node N2, i.e., an anode electrode of the organic light emitting diode OLED.

In this embodiment of the present disclosure, a scan signal with a first polarity may be supplied for the first scan line S1*i* and scan signals with a second polarity may be supplied to the second and third scan lines S2*i*_1 and S3*i*.

In FIG. 14, in the high-frequency operation as shown in FIG. 5 and the low-frequency operation as shown in FIG. 6, operation in an arbitrary frame including the data write period WP and the emission period EP is shown. The arbitrary frame may be one of a plurality of frames that make up one cycle in the high-frequency operation or the first frame of the plurality of frames that make up one cycle in the low-frequency operation.

Furthermore, in FIG. 14, a method of driving the pixel PX_1 connected to an i-th horizontal line and a j-th data line Dj as shown in FIG. 13 will be taken as a representative example. Accordingly, in FIG. 14, scan signals applied to the i-th first to third scan lines S1*i*, S2*i*_1 and S3*i*, a light emission signal applied to the light emission control line Ei and a data signal applied to the data line Dj are shown as an example.

Referring to FIG. 14, a method of driving the display device according to the second embodiment of the present disclosure is substantially the same as the method of driving the display device as described above in connection with FIG. 7 except that the second scan signal applied to the second scan line S2*i*_1 is a second polarity signal according to the pixel structure of FIG. 13, so the overlapping description thereof will not be repeated.

Figure 15:
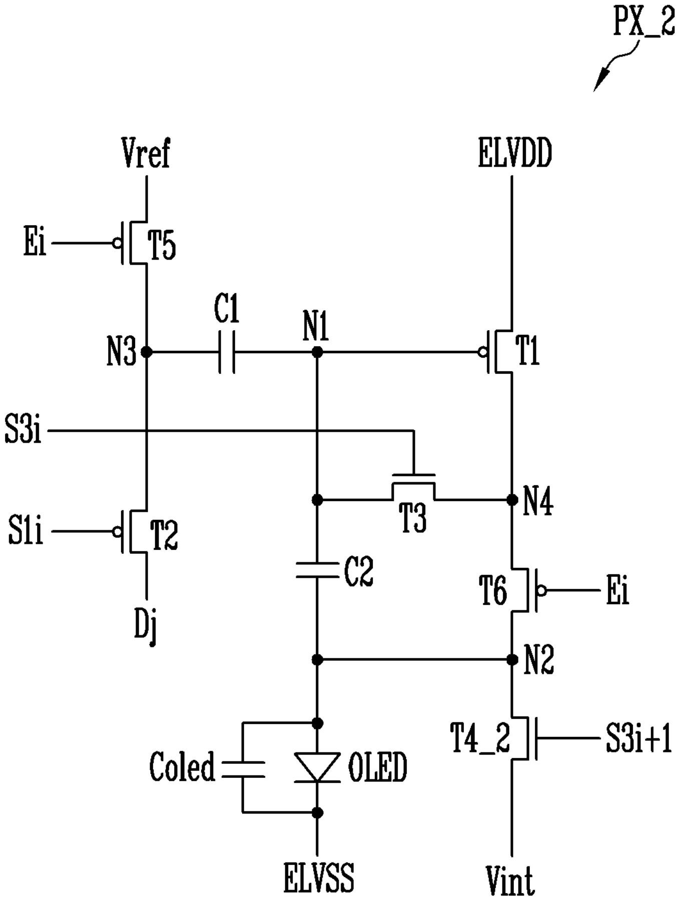
FIG. 15 is a circuit diagram of a pixel, according to a third embodiment of the present disclosure.
Figure 16:
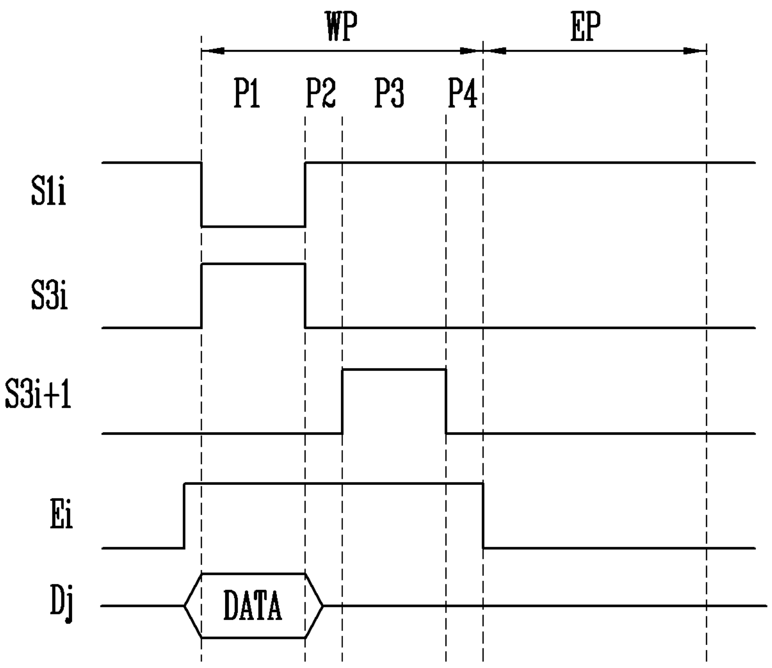
FIG. 16 is a timing diagram representing a method of driving a display device, according to the third embodiment of the present disclosure.

FIG. 15 is a circuit diagram of a pixel, according to a third embodiment of the present disclosure, and FIG. 16 is a timing diagram representing a method of driving a display device, according to the third embodiment of the present disclosure.

In FIG. 15, for convenience of explanation, pixel PX_2 connected to an i-th horizontal line and a j-th data line Dj will be taken as an example.

Referring to FIG. 15, the pixel PX_2 includes first to sixth transistors T1 to T6, first and second capacitors C1 and C2, and an organic light emitting diode OLED. The pixel PX_2 may be substantially the same as the pixel PX_1 as shown in FIG. 13 except that a gate electrode of a fourth transistor T4_2 is connected to an (i+1)-th third scan line S3*i*+1. Accordingly, in FIG. 15, the same reference numerals are allocated to the same elements as in FIG. 13, and detailed description thereof will be omitted.

In the third embodiment of the present disclosure, the fourth transistor T4_2 is connected between the second node N2 and the initialization voltage Vint. The gate electrode of the fourth transistor T4_2 is connected to the (i+1)-th third scan line S3*i*+1. The fourth transistor T4_2 may be turned on in response to a third scan signal applied to the (i+1)-th third scan line S3*i*+1. When the fourth transistor T4_2 is turned on, the initialization voltage Vint may be applied to the second node N2, i.e., an anode electrode of the organic light emitting diode OLED.

In this embodiment, a scan signal with a first polarity may be supplied for the first scan line S1*i* and a scan signal with a second polarity may be supplied to the third scan line S3*i* and S3*i*+1.

In FIG. 16, in the high-frequency operation as shown in FIG. 5 and the low-frequency operation as shown in FIG. 6, operation in an arbitrary frame including the data write period WP and the emission period EP is shown. The arbitrary frame may be one of a plurality of frames that make up one cycle in the high-frequency operation or the first of the plurality of frames that make up one cycle in the low-frequency operation.

Furthermore, in FIG. 16, a method of driving the pixel PX_2 connected to an i-th horizontal line and a j-th data line Dj as shown in FIG. 15 will be taken as a representative example. Accordingly, in FIG. 16, scan signals applied to the i-th first and third scan lines S1*i* and S3*i*, a scan applied supplied to the (i+1)-th third scan line S3*i*+1, a light emission signal applied to the light emission control line Ei and a data signal supplied to the data line Dj are shown as an example.

Referring to FIG. 16, a method of driving the display device according to the third embodiment of the present disclosure is substantially the same as the method of driving the display device as described above in connection with FIG. 14 except that the third scan signal is applied to the gate electrode of the fourth transistor T4_2 through the (i+1)-th third scan line S3*i*+1 according to the pixel structure of FIG. 15, so the overlapping description thereof will not be repeated.

As shown in FIGS. 15 and 16, in the third embodiment of the present disclosure, the pixel PX_2 may be connected to the first scan line S1*i* and the third scan line S3*i* and driven based on the first and third scan signals. In comparison with the first and second embodiments of the present disclosure, the scan driver 30 is not required to have a stage to generate the second scan signal because the second scan line S2*i* is not required for the display 50. As a result, in the third embodiment of the present disclosure, the size of the scan driver 30 and the display 50 may be reduced and driving of the display device 1 may become easier.

Figure 17:
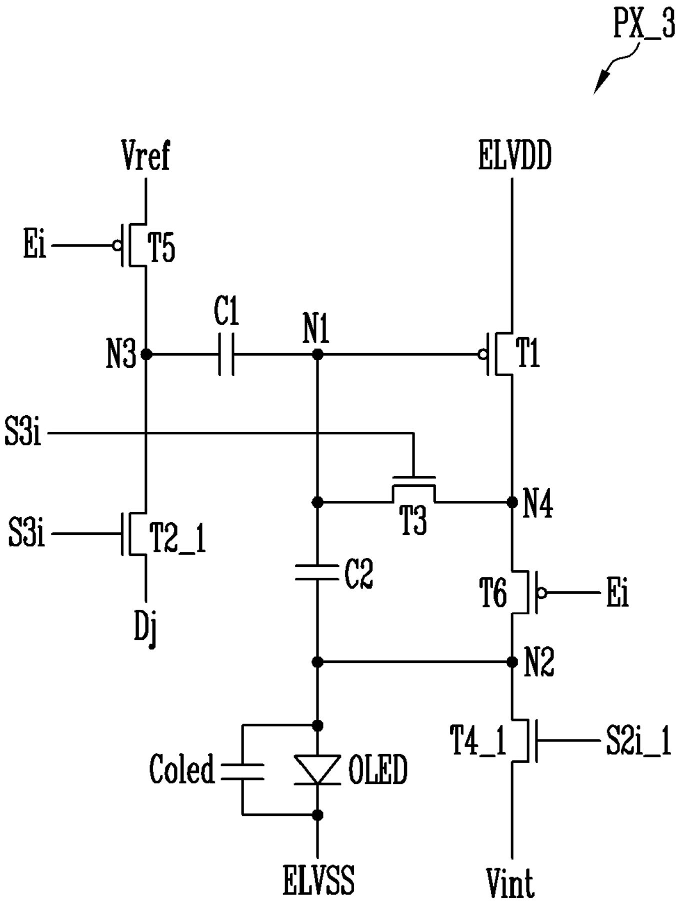
FIG. 17 is a circuit diagram of a pixel, according to a fourth embodiment of the present disclosure.
Figure 18:
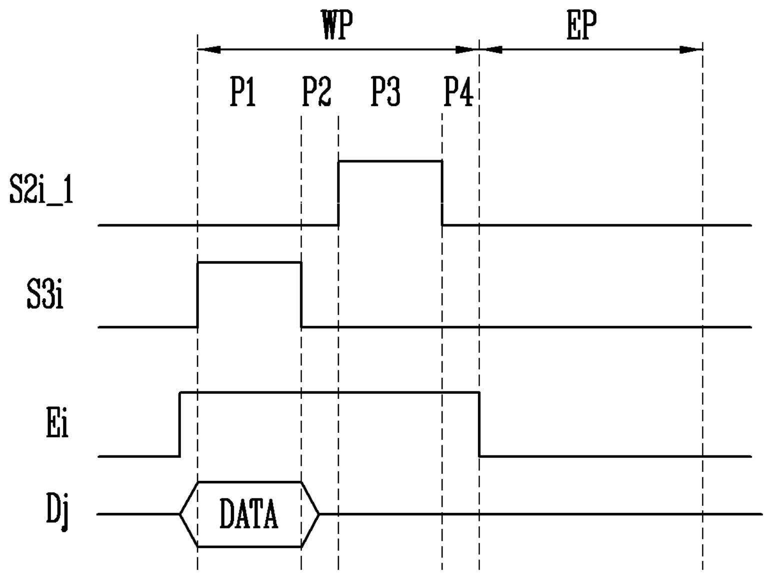
FIG. 18 is a timing diagram representing a method of driving a display device, according to the fourth embodiment of the present disclosure.

FIG. 17 is a circuit diagram of a pixel, according to a fourth embodiment of the present disclosure, and FIG. 18 is a timing diagram representing a method of driving a display device, according to the fourth embodiment of the present disclosure.

In FIG. 17, for convenience of explanation, pixel PX_3 connected to an i-th horizontal line and a j-th data line Dj will be taken as an example.

Referring to FIG. 17, the pixel PX_3 includes first to sixth transistors T1 to T6, first and second capacitors C1 and C2, and an organic light emitting diode OLED. The pixel PX_3 according to the fourth embodiment of the disclosure may be substantially the same as the pixel PX_1 as shown in FIG. 13 except that a second transistor T2_1 is formed of an N-type transistor. Accordingly, in FIG. 17, the same reference numerals are allocated to the same elements as in FIG. 13, and detailed description thereof will be omitted.

In the fourth embodiment of the present disclosure, the second transistor T2_1 is connected between the third node N3 and the data line Dj. A gate electrode of the second transistor T2_1 is connected to a third scan line S3*i*. The second transistor T2_1 may be turned on in response to a third scan signal applied to the third scan line S3*i*. When the second transistor T2_1 is turned on, a data signal applied to the data line Dj may be supplied to the third node N3.

In this embodiment, a scan signal with a second polarity may be supplied to the third scan line S3*i* and the second scan line S2*i*.

In FIG. 18, in the high-frequency operation as shown in FIG. 5 and the low-frequency operation as shown in FIG. 6, operation in an arbitrary frame including the data write period WP and the emission period EP is shown. The arbitrary frame may be one of a plurality of frames that make up one cycle in the high-frequency operation or the first of the plurality of frames that make up one cycle in the low-frequency operation.

Furthermore, in FIG. 18, a method of driving the pixel PX_3 connected to an i-th horizontal line and a j-th data line Dj as shown in FIG. 17 will be taken as a representative example. Accordingly, in FIG. 18, scan signals supplied to the i-th third scan line S3*i*, a light emission signal supplied to the light emission control line Ei and a data signal supplied to the data line Dj are shown as an example.

Referring to FIG. 18, a method of driving the display device according to the fourth embodiment of the present disclosure is substantially the same as the method of driving the display device as described above in connection with FIG. 14 except that the third scan signal is supplied to both the gate electrode of the second transistor T2_1 and the gate electrode of the third transistor T3 through the i-th third scan line S3*i* according to the pixel structure of FIG. 17, so the overlapping description thereof will not be repeated.

Although the fourth transistor T4_1 formed of the N-type transistor is shown in the embodiment of FIG. 17, the present disclosure is not limited thereto. For example, in the fourth embodiment of the present disclosure, the fourth transistor T4_1 may be formed of a P-type transistor, in which case a second scan signal supplied to a second scan line S2*i*_1 is set to have the first polarity as shown in FIG. 7.

Although a gate electrode of the fourth transistor T4_1 is connected to the i-th second scan line S2*i*_1 in the embodiment of FIG. 17, the present disclosure is not limited thereto. For example, in the fourth embodiment of the present disclosure, the gate electrode of the fourth transistor T4_1 may be connected to the (i+1)-th third scan line S3*i*+1 as shown in FIG. 15. In this embodiment, the pixel PX_3 may be connected to the third scan line S3*i* and driven substantially using only the third scan signal. Accordingly, in this embodiment of the present disclosure, the scan driver 30 is not required to have a stage to generate the first and second scan signals, and the first and second scan line S1*i* and S2*i* are not required to be arranged for the display 50. As a result, in the third embodiment of the present disclosure, the size of the scan driver 30 and the display 50 may be reduced and driving of the display device 1 may become easier.

Figure 19:
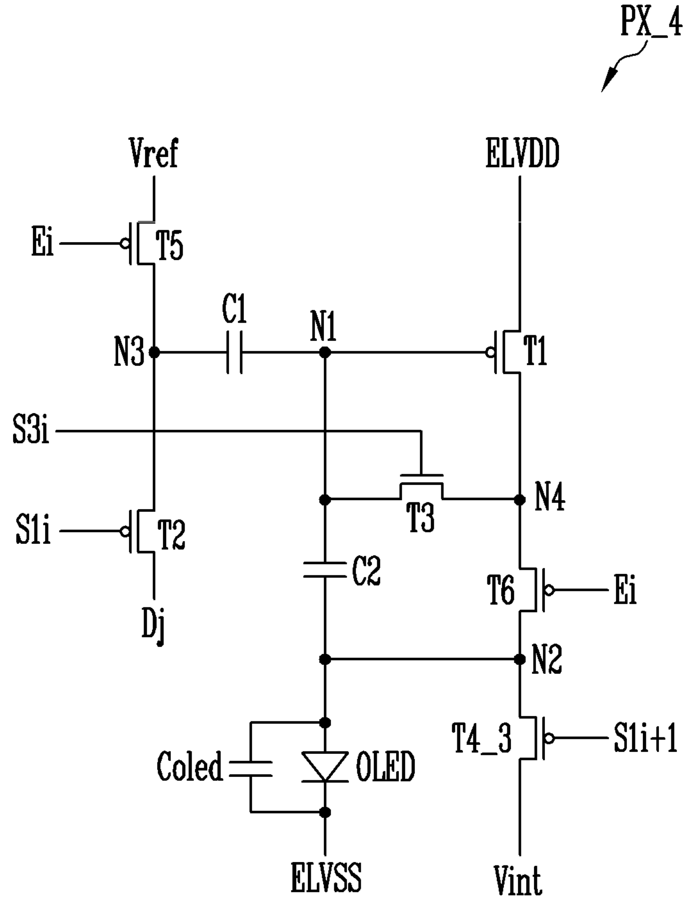
FIG. 19 is a circuit diagram of a pixel, according to a fifth embodiment of the present disclosure.
Figure 20:
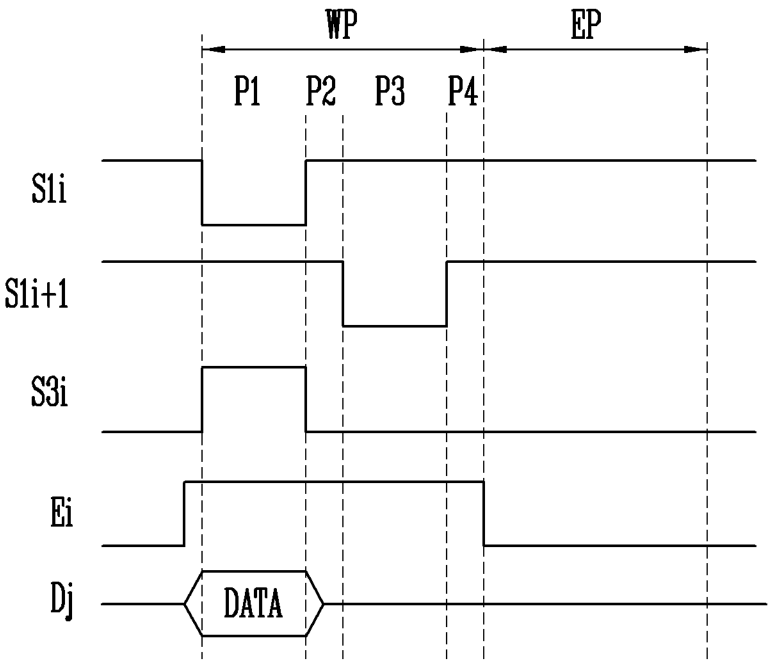
FIG. 20 is a timing diagram representing a method of driving a display device, according to the fifth embodiment of the present disclosure.

FIG. 19 is a circuit diagram of a pixel, according to a fifth embodiment of the present disclosure, and FIG. 20 is a timing diagram representing a method of driving a display device, according to the fifth embodiment of the present disclosure.

In FIG. 19, for convenience of explanation, pixel PX_4 connected to an i-th horizontal line and a j-th data line Dj will be taken as an example.

Referring to FIG. 19, the pixel PX_4 includes first to sixth transistors T1 to T6, first and second capacitors C1 and C2, and an organic light emitting diode OLED. The pixel PX_4 according to the fifth embodiment of the disclosure may be substantially the same as the pixel PX as shown in FIG. 4 except that a gate electrode of a fourth transistor T4_3 is connected to an (i+1)-th first scan line S1*i*+1. Accordingly, in FIG. 19, the same reference numerals are allocated to the same elements as in FIG. 4, and detailed description thereof will be omitted.

In the fifth embodiment of the present disclosure, the fourth transistor T4_3 is connected between the second node N2 and the initialization voltage Vint. The gate electrode of the fourth transistor T4_3 is connected to the (i+1)-th first scan line S1*i*+1. The fourth transistor T4_3 may be turned on in response to a first scan signal applied to the (i+1)-th first scan line S1*i*+1. When the fourth transistor T4_3 is turned on, the initialization voltage Vint may be applied to the second node N2, i.e., an anode electrode of the organic light emitting diode OLED.

In this embodiment, a scan signal with the first polarity may be supplied to the first scan line S1*i* and S1*i*+1 and a scan signal with the second polarity may be supplied to the third scan line S3*i*.

In FIG. 20, in the high-frequency operation as shown in FIG. 5 and the low-frequency operation as shown in FIG. 6, operation in an arbitrary frame including the data write period WP and the emission period EP is shown. The arbitrary frame may be one of a plurality of frames that make up one cycle in the high-frequency operation or the first of the plurality of frames that make up one cycle in the low-frequency operation.

Furthermore, in FIG. 20, a method of driving the pixel PX_4 connected to an i-th horizontal line and a j-th data line Dj as shown in FIG. 19 will be taken as a representative example. Accordingly, in FIG. 20, scan signals applied to the i-th first and third scan lines S1*i* and S3*i*, a scan signal applied to the (i+1)-th first scan line S1*i*+1, a light emission signal applied to the light emission control line Ei and a data signal supplied to the data line Dj are shown as an example.

Referring to FIG. 20, a method of driving the display device according to the fifth embodiment of the present disclosure is substantially the same as the method of driving the display device as described above in connection with FIG. 7 except that the first scan signal is applied to the gate electrode of the fourth transistor T4_3 through the (i+1)-th first scan line S1*i*+1 according to the pixel structure of FIG. 19, so the overlapping description thereof will not be repeated.

Figure 21:
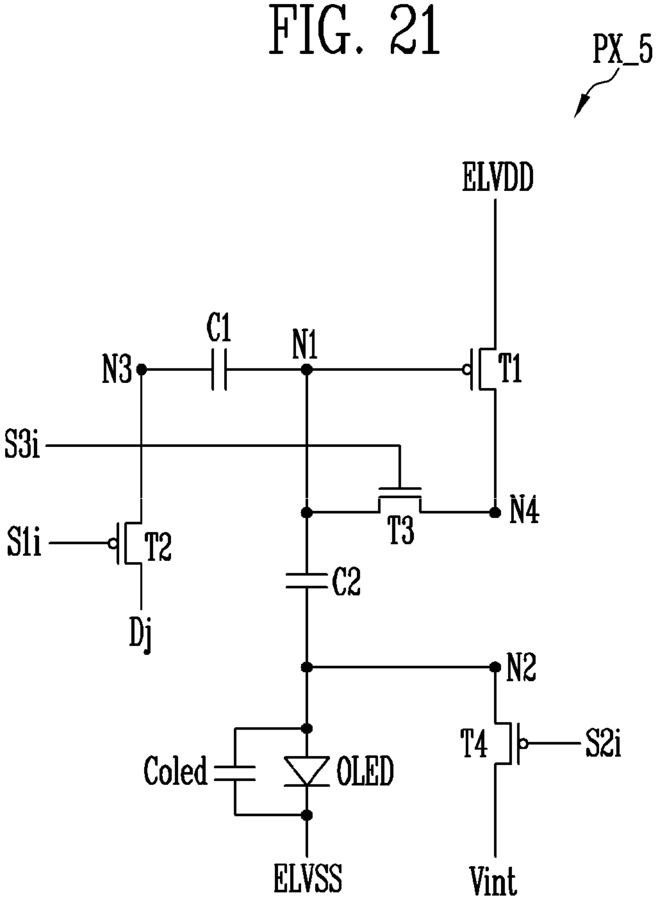
FIG. 21 is a circuit diagram of a pixel, according to a sixth embodiment of the present disclosure.
Figure 22:
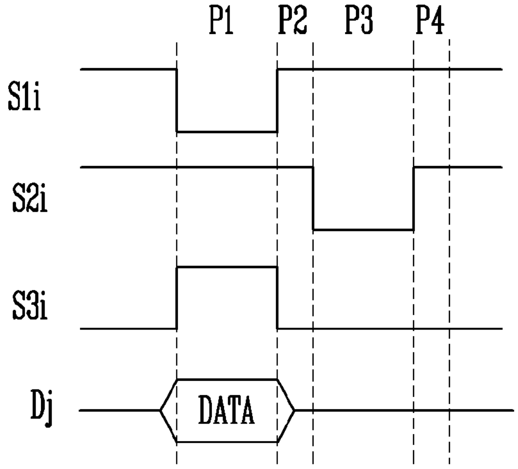
FIG. 22 is a timing diagram representing a method of driving a display device, according to the sixth embodiment of the present disclosure.

FIG. 21 is a circuit diagram of a pixel, according to a sixth embodiment of the present disclosure, and FIG. 22 is a timing diagram representing a method of driving a display device, according to the sixth embodiment of the present disclosure.

In FIG. 21, for convenience of explanation, pixel PX_5 connected to an i-th horizontal line and a j-th data line Dj will be taken as an example.

Referring to FIG. 21, the pixel PX_5 includes first to fourth transistors T1 to T4, first and second capacitors C1 and C2, and an organic light emitting diode OLED. The pixel PX_5 may be substantially the same as the pixel PX as shown in FIG. 4 except that the fifth and sixth transistors T5 and T6 are omitted.

In other words, the pixel PX_5 according to the sixth embodiment of the present disclosure corresponds to the pixel PX show in FIG. 4 in which the light emission signal is always kept at the turn-off level, leaving the fifth and sixth transistors T5 and T6 turned off Hence, the pixel PX_5 shown in FIG. 21 is driven in the same manner as in the data write period WP in the timing diagram shown in FIG. 7. Accordingly, the pixel PX_5 according to FIGS. 21 and 22 is configured to perform an operation for setting voltages for the first to third nodes N1 to N3 during the data write period WP.

While various embodiments have been described above, those skilled in the art will appreciate that various modifications, additions and substitutions are possible, without departing from the scope and spirit of the present disclosure. Therefore, the embodiments disclosed in this specification are only for illustrative purposes rather than limiting the technical spirit of the present disclosure. The scope of the present disclosure must be defined by the accompanying claims.

What is claimed is:

1. A pixel comprising:

a first transistor electrically connected between a first power source and a fourth node, and including a gate electrode electrically connected to a first node;

a second transistor electrically connected between a third node and a data line, and turned on in response to a scan signal of a first polarity applied to a first scan line;

a third transistor electrically connected between the first node and the fourth node, and turned on in response to a scan signal of a second polarity applied to a third scan line, wherein the second polarity is opposite to the first polarity;

a fourth transistor electrically connected between a second node and an initialization voltage, and turned on in response to a scan signal applied to a second scan line;

a light emitting diode connected between the second node and a second power source and including an anode electrode electrically connected to the second node;

a first capacitor connected between the third node and the first node; and a second capacitor connected between the first node and the second node.

2. The pixel of claim 1, wherein the fourth transistor is turned on in response to the scan signal of the first polarity applied to the third scan line.

3. The pixel of claim 1, wherein the fourth transistor is turned on in response to the scan signal of the second polarity applied to the third scan line.

4. The pixel of claim 1, wherein the first polarity is a low level, and the second polarity is a high level.

5. The pixel of claim 1, wherein the second scan line is an i-th second scan line, and the third scan line is an i-th third scan line, where i is a natural number, and wherein the i-th second scan line is the same scan line as an (i+1)-th third scan line.

6. The pixel of claim 1, wherein the first scan line is an i-th first scan line, and the second scan line is an i-th second scan line, where i is a natural number, and wherein the i-th second scan line is the same scan line as an (i+1)-th first scan line.

7. The pixel of claim 1, further comprising:

a fifth transistor electrically connected between a reference voltage and the third node and turned on in response to a light emission signal applied to a light emission control line.

8. The pixel of claim 1, further comprising:

a sixth transistor electrically connected between the fourth node and the second node and turned on in response to a light emission signal applied to a light emission control line.

9. The pixel of claim 1, wherein the second transistor and the third transistor are turned on during a first period, and the fourth transistor is turned on during a second period subsequent to the first period.

10. A pixel comprising:

a first transistor electrically connected between a first power source and a fourth node, and including a gate electrode electrically connected to a first node;

a second transistor electrically connected between a third node and a data line, and turned on in response to a scan signal of a first polarity applied to a first scan line;

a third transistor electrically connected between the first node and the fourth node, and turned on in response to the scan signal of the first polarity applied to a third scan line;

a fourth transistor electrically connected between a second node and an initialization voltage, and turned on in response to a scan signal applied to a second scan line;

a light emitting diode connected between the second node and a second power source and including an anode electrode electrically connected to the second node;

a first capacitor connected between the third node and the first node; and a second capacitor connected between the first node and the second node.

11. The pixel of claim 10, wherein the first polarity is a high level.

12. The pixel of claim 11, wherein the fourth transistor is turned on in response to a scan signal of a second polarity applied to the third scan line.

13. The pixel of claim 12, wherein the second polarity is a low level.

14. The pixel of claim 10, wherein the first scan line is the same as the third scan line.

15. The pixel of claim 14, wherein the second scan line is an i-th second scan line, and the third scan line is an i-th third scan line, where i is a natural number, and wherein the i-th second scan line is the same as an (i+1)-th third scan line.

16. A driving method of a pixel, wherein the pixel comprises:

a first transistor electrically connected between a first power source and a fourth node, and including a gate electrode electrically connected to a first node;

a second transistor electrically connected between a third node and a data line, and turned on in response to a scan signal of a first polarity applied to a first scan line;

a third transistor electrically connected between the first node and the fourth node, and turned on in response to a scan signal of a second polarity applied to a third scan line;

a fourth transistor electrically connected between a second node and an initialization voltage, and turned on in response to a scan signal applied to a second scan line;

a light emitting diode connected between the second node and a second power source and including an anode electrode electrically connected to the second node;

a first capacitor connected between the third node and the first node; and a second capacitor connected between the first node and the second node, and wherein the driving method of the pixel comprises:

turning on the second transistor and the third transistor during a first period; and turning on the fourth transistor during a second period subsequent to the first period.

17. The driving method of claim 16, wherein the first polarity is the same as the second polarity.

18. The driving method of claim 17, wherein each of the first polarity and the second polarity is a high level.

19. The driving method of claim 16, wherein the first polarity is opposite to the second polarity.

20. The driving method of claim 19, wherein the first polarity is a high level, and the second polarity is a low level.

* * * * *